United States Patent [19]

Massions et al.

[11] Patent Number: 4,776,907

[45] Date of Patent: Oct. 11, 1988

[54] METHOD OF PROVIDING RESIN FREE SURFACES ADJACENT A BONDED JOINT

[75] Inventors: Vincent P. Massions, Derby; Arnold E. Florio, Wichita, both of Kans.

[73] Assignee: The Boeing Company, Seattle, Wash.

[21] Appl. No.: 100,899

[22] Filed: Sep. 25, 1987

[51] Int. Cl.$^4$ ............................................. B32B 31/20
[52] U.S. Cl. ..................................... 156/87; 156/252; 156/272.8; 156/285; 156/286; 156/289; 156/295; 264/102; 264/510
[58] Field of Search ................ 156/87, 285, 286, 289, 156/295, 382, 90, 252, 272.8; 264/102, 510

[56] References Cited

U.S. PATENT DOCUMENTS

| | | | |
|---|---|---|---|
| 3,666,600 | 5/1972 | Yoshino | 156/382 |
| 3,703,422 | 11/1972 | Yoshino | 156/87 |
| 3,706,621 | 12/1972 | Lichtman | 156/285 |
| 4,311,661 | 1/1982 | Palmer | 264/510 |
| 4,504,341 | 3/1985 | Radzwill et al. | 156/286 |

Primary Examiner—Caleb Weston
Attorney, Agent, or Firm—Finnegan, Henderson, Farabow, Garrett & Dunner

[57] ABSTRACT

A method of resin bonding opposing surfaces of a pair of members for providing a joint having substantially resin free surfaces adjacent the joint. The adjacent surfaces and the joint are covered in intimate contact with a thin, perforated, flexible, and nonadherent film for perforating resin extruded from the joint during application of bonding pressure. The nonadherent film is covered with a sheet of flexible absorbent material for absorbing the resin perforated through perforations along the film. Bonding pressure is applied to the joint to extrude the resin from the joint. The nonadherent film and the absorbent sheet is then removed from the surfaces adjacent to the joint to facilitate secondary bonding to the adjacent surfaces.

13 Claims, 3 Drawing Sheets

METHOD OF PROVIDING RESIN FREE SURFACES ADJACENT A BONDED JOINT

BACKGROUND OF THE INVENTION

The present invention relates to an improved method for providing a resin bonded joint having substantially resin free surfaces adjacent to the joint, thereby enhancing secondary bonding on the adjacent surfaces. This improved method finds particular utility for bonding structural members used in aircraft where the tolerance for misalignment from residual resin deposits is slight.

Typically, when structural members are bonded, excessive adhesive or resin, commonly referred to as flash, tends to bleed from a joint between the bonded members and onto surfaces adjacent to the joint. FIG. 1 depicts a structure having one doubler member 10, bonded together to a lower member 12, along a resin layer 14. A first side 16 reflects the typical spreading of flash 18 along exterior surfaces ajacent the adhesive layer 14 resulting from application of pressure during the bonding operation.

The flash 18 shown on the first side 16 of the bonded members 10, 12 is commonly removed by machining or grinding the excess adhesive coated on the exterior surfaces of the bonded members 10, 12, because such excess resin may have a significant impact on overall weight and stability. In addition to the obvious time considerations, such corrective measures increase the risk of further error, which may be unacceptable for many applications, particularly those requiring a high degree of precision.

A conventional method for removing the flash is shown on a second side 20 of the bonded doubler member 10 and lower member 12. According to this method, a flash breaker (i.e., tape) 19 is extended along the surface of the lower member 12 adjacent to the doubler member 10 and the resin layer 14. The flash breaker 19 collects the flash 18 and the flash breaker 19 is then stripped from the surface of the lower member 12 to remove the flash.

The conventional method illustrated on the second side 20 of FIG. 1 is unsatisfactory. According to this technique, as the flash breaker 19 is removed from member 12, particles of tape 19a remain as do particles of flash 18a which must also be removed by machining or grinding though not as much as shown on side 16, since bonding materials oftentimes will not adhere to contaminated surfaces during rebonding. Occasionally, the flash breaker tape 19a flows under the doubler member 10 and is trapped resulting in major rework requiring the removal of the doubler member 10, reprocessing, and re-bonding. This rework is time consuming and greatly increases cost.

Another conventional method of removing adhesive flash 18 is shown in FIG. 2. In accordance with this method, a teflon-coated fiberglass fabric sheet 28 and an absorbent material 30 are extended over the upper and lower bonded members 11a, 11b. The fiberglass fabric sheet 28, while absorbing a small amount of flash, causes the flash to bridge, as depicted by the reference numeral 18b in FIG. 2. The bridged flash 18b also must be removed by machining to provide a suitable, adhesive free surface. As an alternative to this method, a highly compacted absorbing material in the shape of a gasket may be extended over the fiberglass sheet 28 and around the periphery of the bonded members. This alternative is costly, time consuming, and impractical depending on the configuration of the bonded structures.

SUMMARY OF THE INVENTION

The present invention overcomes the problems and disadvantages of the prior art by more effectively absorbing the excess adhesive or resin extruded from a bonded joint, thereby providing substantially resin free surfaces adjacent to the bonded joint without requiring remedial efforts prior to secondary bonding.

Additional objects and advantages of the invention will be set forth in part in the description which follows, and in part will be obvious from the description or may be learned by practice of the invention. The objects and advantages of the invention may be learned by and attained by means of the instrumentalities and combination of steps particularly pointed out in the pending claims.

To achieve the foregoing objects and in accordance with the purpose of the invention, as embodied and broadly described herein, the method of resin bonding surfaces of a pair of members for providing a joint having substantially resin free surfaces adjacent the joint, comprises:
 (a) covering in intimate physical contact the adjacent surfaces and the joint with a thin perforated, flexible, and nonadherent film that allows resin to be extruded from the bonded joint through the film during application of bonding pressure:
 (b) covering the plastic film with a sheet of flexible asborbent material for absorbing the resin extruded through perforations within the film; p1 (c) applying bonding pressure tending to extrude the resin from the joint; and
 (d) removing the nonadherent film and the absorbent sheet from the surfaces adjacent to the joint.

Preferably, the step of covering the adjacent surfaces and the joint with the nonadherent film is preceded by forming a random pattern of perforations on the film. A laser, among other devices, may be used to pierce the film and thereby form the perforations. After applying bonding pressure, the resin is extruded through the perforated film and absorbed by the absorbent sheet substantially precluding reentry of the resin through the nonadherent film and onto the surfaces adjacent the joint.

In addition, the step of applying bonding pressure may be accomplished by applying atmospheric and/or subatmospheric pressure to the joint causing the resin to be extruded from the joint by positive pressure or vacuum.

Further, to achieve the foregoing objects and in accordance with the purpose of the invention, as embodied and broadly described herein, the method may include bonding substantially coplanar surfaces or bonding adjacent surfaces which define an angle have a vortex aligned with the joint. In the latter embodiment, the step of covering the adjacent surfaces and the joint with the nonadherent film includes creasing the nonadherent film at the vortex of the angle to provide intimate contact between the nonadherent film and the joint.

Preferably, at least one of the bonded members is a metal reinforcing member. Alternatively, at least one of the members may be a honeycomb reinforcing member. Still further, the step of removing the nonadherent film and the absorbent sheet which produces a substantially resin free surface adjacent the joint, may be followed by providing a third reinforcing member and bonding the third reinforcing member along the surfaces adjacent the joint. It also is preferred that the resin composition be nonvolatile and typically cured by an addition type chemical reaction.

The accompanying drawings, which are incorporated in and constitute part of this specification, illustrate one embodiment of the invention and, together with the description, serve to explain the principles of the invention.

DESCRIPTION OF THE PREFERRED EMBODIMENT

Figure 1:
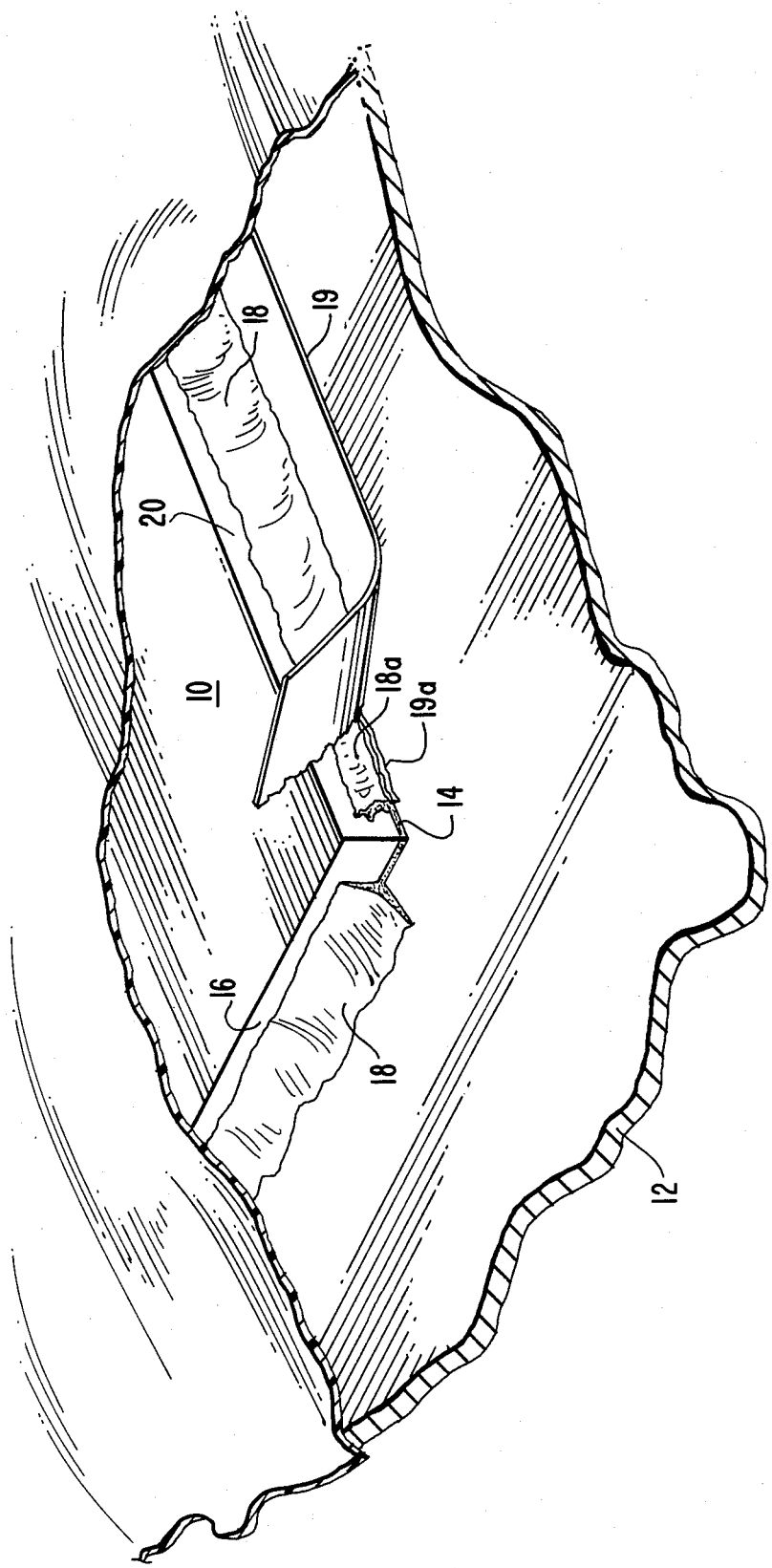
FIG. 1 depicts adhesive flash extending along surfaces adjacent a bonded joint, as well as a conventional method for removing flash from the adjacent surfaces.

Reference will now be made, in detail, to the presently preferred embodiments of the invention, examples of which are illustrated in the accompanying drawings. Elements common to the conventional methods and embodiments of the present invention will be referred to by like reference numerals.

Figure 3:
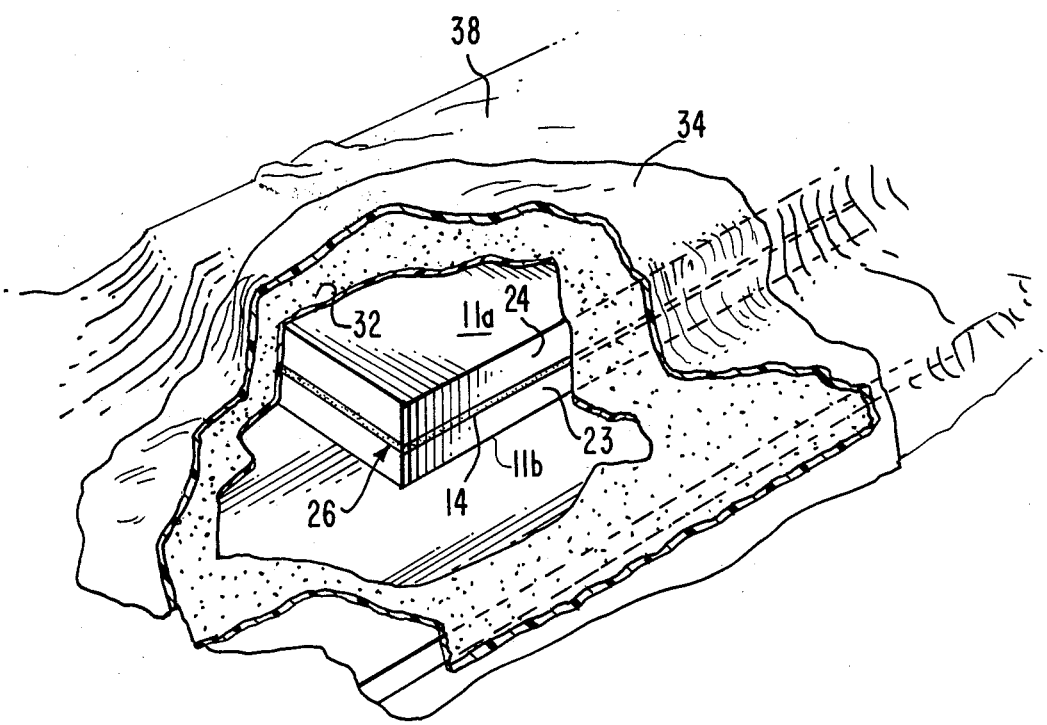
FIG. 3 is a perspective view of a method for removing flash from the surfaces adjacent a bonded joint in accordance with the present invention.

Referring now to FIG. 3, it may be seen that a bonded structure includes bonded upper and lower members 11a, 11b having an adhesive layer 14 sandwiched between opposing surfaces of bonded members 11a, 11b to define a joint 26 along exterior surfaces of the bonded uper and lower members 11a, 11b at the resin layer 14. The upper member 11a contains an upper surface 24 and the lower member 12 has a lower surface 23, both of which are adjacent to the joint 26.

In accordance with the present invention, a flexible, nonadherent film is disposed over the surfaces adjacent to the joint to provide substantially resin free surfaces adjacent the joint. As embodied herein and shown in FIGS. 3 and 4, a thin, nonadherent film 32, such as teflon (polytetraflouroethylene or polytetraflouropropylene) substantially covers the upper and lower members 11a, 11b including the upper and lower surfaces 24, 23 adjacent the joint 26. The nonadherent film 32 is covered with a sheet 34 of flexible, stretchable, absorbent material, such as a low density random orientated polyester mat.

Figure 4:
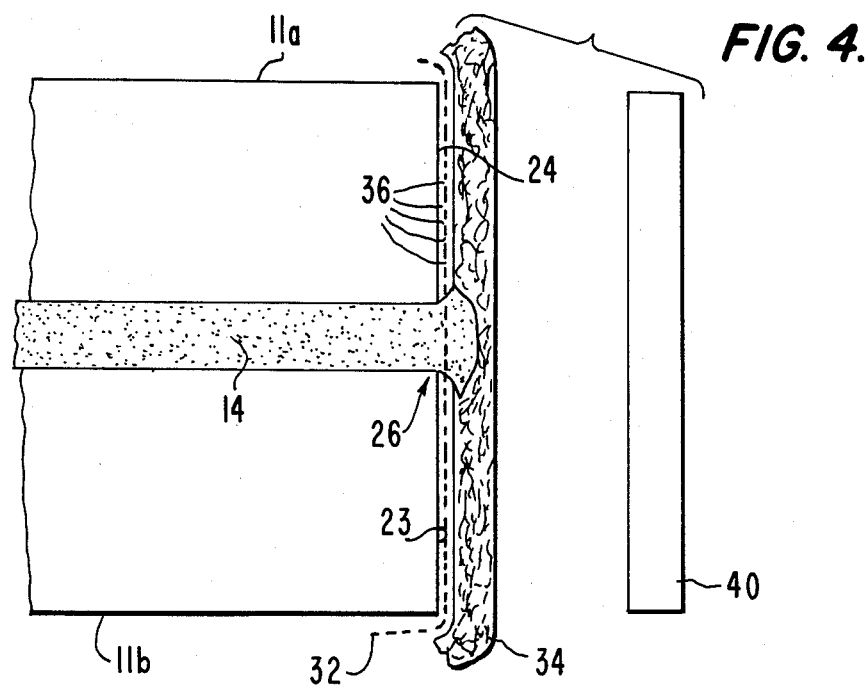
FIG. 4 illustrates a bonded joint having adjacent surfaces which are substantially coplanar.
Figure 5:
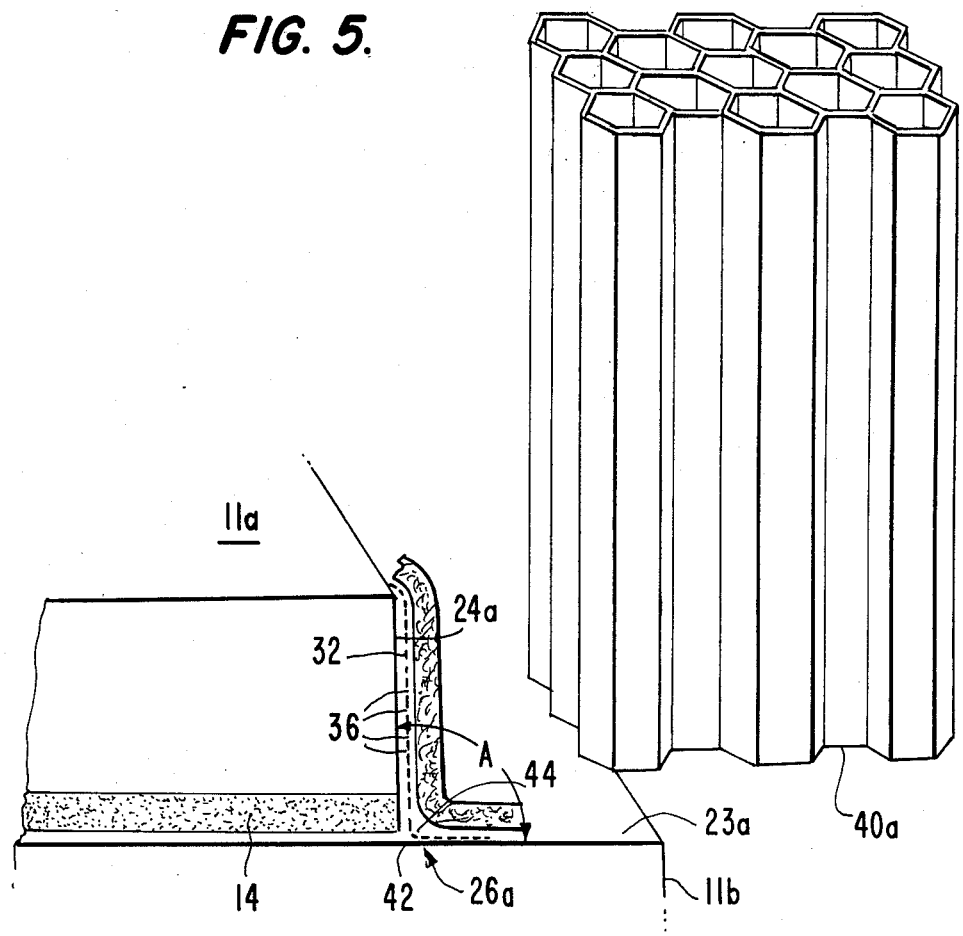
FIG. 5 illustrates a bonded joint having adjacent surfaces which define an angle having a vortex centered on the joint.

In accordance with the present invention, the nonadherent film 32 is flexible and capable of covering the upper and lower members so as to be in intimate physical contact with the upper and lower surfaces 24, 23, as well as the joint 26. Importantly, as shown in FIGS. 4 and 5, the nonadherent film 26 is perforated and includes a plurality of perforations 36. Preferably, the perforations 36 are formed in a random pattern by laser drilling or by other conventional techniques of piercing holes within the adherent film 32. The perforations 36 may have various sizes and orientations. For example, it may be advantageous for the perforations in some cases to be holes approximately 0.020 inch in diameter and spaced 1.5 millimeters from center to center.

In accordance with the present invention bonding pressure is applied to the joint 26 by the application of atmospheric or subatmospheric pressure to the joint 26 causing excess resin, i.e., flash, to be extruded from the joint 26. In this regard, an autoclave and/or an oven may be used to apply pressure under vacuum. Alternatively, positive pressure may be applied to the upper and/or lower members 11a, 11b through a flexible membrane 38, such as nylon bagging material, as shown in FIG. 3.

As embodied herein and shown in FIG. 4, when bonding pressure is applied to the joint 26, excess resin is extruded through the perforations 36 and into the absorbent sheet 34. The perforations 36 channel the excess resin into the absorbent sheet and random disposition of the perforations 36 substantially precludes reentry of the excess resin through the perforations 36 and onto the upper and lower surfaces 24, 23 adjacent the joint 26. Further, the perforations 36 produce narrow streams of resin causing the resin to sever easily and cleanly when the perforated, nonadherent film 32 and absorbent sheet 34 is removed, thus providing a substantially smooth resin layer along the exterior of the joint.

The perforated, nonadherent film 32 must be of a material which will be flexible and non-contaminating to the joint and the structural components. The film 32 also must have structural integrity after perforation, to be strippable, after a bonding cure cycle. The perforations must be large enough to permit the flow of adhesive resin, during the bonding cure cycle. Each adhesive system requires a variation in hole size and quantity depending upon the adhesive used. Therefore, the perforations must be adjusted to suit the flow viscosity characteristic of a given joint bond adhesive.

In accordance with the present invention, as shown in FIG. 4, the upper and lower surfaces 24, 23 are substantially coplanar, so that removal of the non-adherent film 32 produces a substantially planar surface proximate the joint 26 along the exterior of the bonded upper and lower members 11a, 11b. The substantially planar surface facilitates secondary bonding to a third reinforcing member 40.

In another embodiment shown in FIG. 5, upper and lower surfaces 24a, 23a define an angle "A" having a vortex 42 aligned with the joint 26a. As embodied herein, the angle "A" may be 90°, as shown in FIG. 5, or any desired angular disposition. In accordance with this embodiment of the present invention, the nonadherent film 32 is creased at the vortex 42 to provide intimate contact between the nonadherent film 32 and the joint 26a.

It is preferred that the selected resin be an adhesive that reaches a cured state as a result of an addition type chemical reaction where

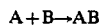

with little or no volatile reaction products. A typical example would be modified epoxy systems with heat activated catalysts. In addition, the flow or viscosity must be predetermined to avoid the incorporation of adhesives having excessive bleed out beyond the joint 26. Still further, the upper and lower members 11a, 11b may be formed of metal. Preferably, the upper and lower members 11a, 11b povide metal-to-metal, (aluminum-to-aluminum,) or metal-to-honeycomb core (aluminum-to-aluminum honeycomb core) bonded structures.

The method of the present invention includes a series of discrete steps relating to the previously described elements. Initially, adjacent surfaces 24, 23 and the joint 26 are covered with the thin, perforated, flexible, and nonadherent film 32, which perforates the resin extruded from the joint 26 in response to application of bonding pressure. The nonadherent film 32 is covered with the sheet 34 of flexible absorbent material for absorbing the resin perforated through the perforations 36 along the film 32. Bonding pressure is applied to the joint 26 tending to extrude the resin from the joint 26. Finally, the nonadherent film 32 and the absorbent sheet 34 are removed from the surfaces 24, 23 leaving substantially resin free surfaces 24, 23 and facilitating eventual secondary bonding, to a third reinforcing member 40a, 40 (honeycomb (FIG. 5) or solid member (FIG. 4)).

In accordance with the method previously described, it is preferable that the step of covering the adjacent surfaces 24, 23 and the joint 26 with the nonadherent film 32 be preceded by forming random perforations 36 on the film 32. A laser or other suitable piercing device may be used to form the perforations 36. After applying the bonding pressure, the perforated resin is absorbed by the absorbent sheet 34 substantially precluding reentry of the resin through the nonadherent film 32 and onto the surfaces 24, 23 adjacent the joint 26. The bonding pressure herein described may include application of positive atmospheric pressure or vacuum.

In accordance with the present invention, as embodied and broadly described herein, the method may include bonding substantially coplanar surfaces or bonding angularly disposed adjacent surfaces. When the adjacent surfaces define the angle 42, the step of covering the adjacent surfaces and the joint 26a with the nonadherent film includes creasing the nonadherent film 32 at the vortex 44 of the angle 42 to provide intimate contact between the nonadherent film 32 and the joint 26a.

As embodied herein, the method of the present invention facilitates secondary bonding to substantially resin free surfaces adjacent the joint. As such, the step of removing the nonadherent film 32 and the absorbent sheet 34 may be followed by providing a third reinforcing member 40 along the surfaces 24, 24a, 23 adjacent the joint 26.

Figure 2:
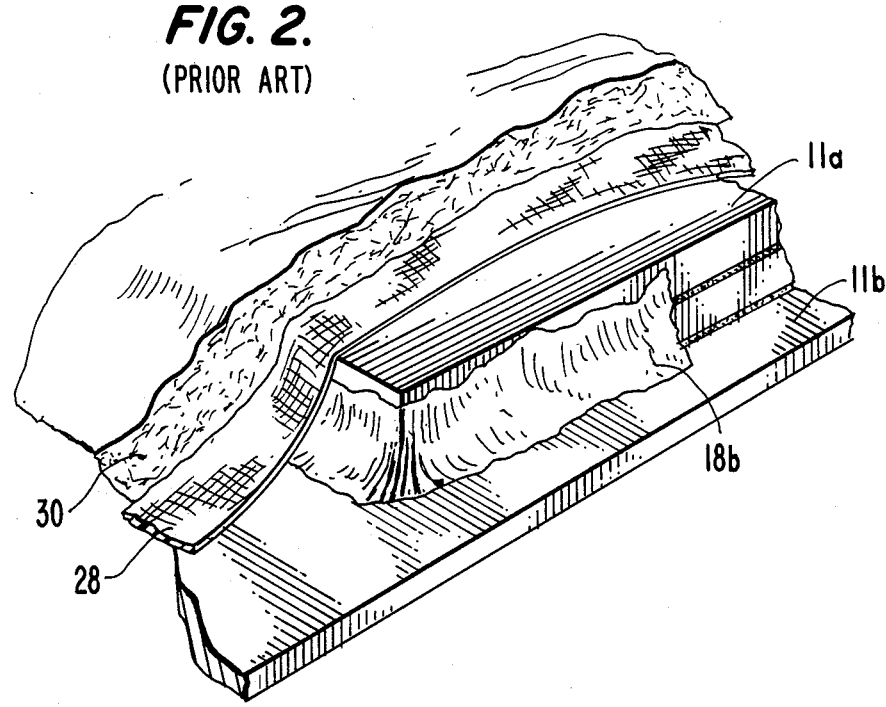
FIG. 2 depicts another conventional method for removing flash from the surfaces adjacent a bonded joint.

The present invention achieves significant time and cost savings in the production of substantially resin free surfaces adjacent the joint of a bonded structure. The advantages of the method described herein has particular utility in the aircraft industry, in which the tolerance for misalignment along the bonded surfaces is minimal. The solution to the problem has eluded others in the industry, as evidenced by the conventional methods for removing resin described herein and illustrated in FIGS. 1 and 2.

Thus, in accordance with the present invention, resin or flash extruded from the joint is perforated by a thin film layer 32 and absorbed by an adjacent absorbent layer which cooperate to preclude residual resin from being deposited on the surfaces of the bonded members adjacent the joint 26. Other embodiments of the invention will be apparent to those skilled in the art from consideration of the specification and practice of the invention disclosed herein. It is intended that the specification and examples be considered as exemplary and explanatory only, the true scope and spirit of the invention being indicated by claims which follow.

What is claimed is:

1. A method of resin bonding opposing surfaces of a pair of members for providing a joint having substantially resin free surfaces adjacent said joint, comprising the steps of:
    covering in intimate physical contact said adjacent surfaces and said joint with a thin, perforated, flexible, and nonadherent film for perforating resin extruded from said joint during application of bonding pressure;
    covering said nonadherent film with a sheet of flexible absorbent material for absorbing the resin perforated through perforations along said film;
    applying bonding pressure tending to extrude said resin from said joint; and
    removing said nonadherent film and said absorbent sheet from said surfaces adjacent to said joint.

2. The method according to claim 1, wherein the step of covering said adjacent surfaces and said joint with said nonadherent film is preceded by forming a random pattern of perforations on said nonadherent film.

3. The method according to claim 2, wherein the step of covering said adjacent surfaces and said joint with said nonadherent film is preceded by forming perforations on said nonadherent film by a laser.

4. The method according to claim 1, wherein the step of applying bonding pressure includes applying subatmospheric pressure to said joint.

5. The method according to claim 1, wherein the step of applying bonding pressure includes applying positive atmospheric pressure to said joint.

6. The method according to claim 2, wherein the step of applying bonding pressure is followed by absorbing within said absorbent sheet said resin shaped by said random pattern of perforations, substantially precluding reentry of said resin through said nonadherent film and onto said adjacent surfaces.

7. The method according to claim 1, wherein said adjacent surfaces are substantially coplanar.

8. The method according to claim 1, wherein said adjacent surfaces define an angle having a vortex aligned with said joint.

9. The method according to claim 8, wherein the step of covering said adjacent surfaces and said joint with said nonadherent film includes creasing said nonadherent film at said vortex to provide intimate contact between said nonadherent film and said joint.

10. The method according to claim 1, wherein at least one of said members is a metal reinforcing member.

11. The method according to claim 1, wherein at least one of said members is a honeycomb reinforcing member.

12. The method according to claim 1, wherein the step of removing said nonadherent film and said absorbent sheet is followed by providing a third reinforcing member and bonding said third reinforcing member along said adjacent surfaces.

13. The method according to claim 1, wherein said resin is nonvolatile and wherein said resin is cured by an addition type chemical reaction.

* * * * *